United States Patent
Dang

(10) Patent No.: US 12,434,146 B2
(45) Date of Patent: Oct. 7, 2025

(54) PATHFINDING CONTROL METHOD AND DEVICE IN GAME

(71) Applicant: NETEASE (HANGZHOU) NETWORK CO., LTD., Zhejiang (CN)

(72) Inventor: Xiangqian Dang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 337 days.

(21) Appl. No.: 18/004,308

(22) PCT Filed: Mar. 16, 2021

(86) PCT No.: PCT/CN2021/081063
§ 371 (c)(1),
(2) Date: Jan. 5, 2023

(87) PCT Pub. No.: WO2022/007429
PCT Pub. Date: Jan. 13, 2022

(65) Prior Publication Data
US 2023/0219000 A1    Jul. 13, 2023

(30) Foreign Application Priority Data
Jul. 6, 2020  (CN) .......................... 202010642984.9

(51) Int. Cl.
*A63F 13/56* (2014.01)
*A63F 13/2145* (2014.01)
(Continued)

(52) U.S. Cl.
CPC .......... *A63F 13/56* (2014.09); *A63F 13/2145* (2014.09); *G06F 3/0485* (2013.01); *G06F 3/0488* (2013.01)

(58) Field of Classification Search
CPC .... A63F 13/56; A63F 13/2145; G06F 3/0485; G06F 3/0488
See application file for complete search history.

(56) References Cited

U.S. PATENT DOCUMENTS

| | | |
|---|---|---|
| 2016/0199694 A1 | 7/2016 | Doherty et al. |
| 2017/0193425 A1 | 7/2017 | Roman et al. |
| 2018/0219426 A1 | 8/2018 | Zeine et al. |

FOREIGN PATENT DOCUMENTS

| | | |
|---|---|---|
| CN | 103207951 A | 7/2013 |
| CN | 104784934 A | 7/2015 |

(Continued)

OTHER PUBLICATIONS

Starcraft 2 played using 3M Multi-touch Displays, https://www.youtube.com/watch?v=6E36k70cKAw&t=102s, published on Nov. 23, 2010.*

(Continued)

*Primary Examiner* — Yingchuan Zhang
(74) *Attorney, Agent, or Firm* — Qinghong Xu

(57) ABSTRACT

A pathfinding control method in a game, including: in response to a first touch operation acting on a movement control area, controlling a first virtual character to move in a game scene; when the first touch operation satisfies a trigger condition, providing at least one position identifier in a designated area of a graphical user interface, the position identifier corresponding to a position in the game scene; determining a first target position identifier from the at least one position identifier; and controlling the first virtual character to automatically find a path to a position corresponding to the first target position identifier in the game scene.

20 Claims, 9 Drawing Sheets

(51) Int. Cl.
G06F 3/0485 (2022.01)
G06F 3/0488 (2022.01)

(56) References Cited

FOREIGN PATENT DOCUMENTS

| | | |
|---|---|---|
| CN | 106582023 A | 4/2017 |
| CN | 107835148 A | 3/2018 |
| CN | 108245888 A | 7/2018 |
| CN | 108379844 A | 8/2018 |
| CN | 109621420 A | 4/2019 |
| CN | 110141862 A | 8/2019 |
| CN | 110772791 A | 2/2020 |
| CN | 110812844 A | 2/2020 |
| CN | 111013146 A | 4/2020 |
| CN | 111249735 A | 6/2020 |
| CN | 111760268 A | 10/2020 |
| JP | 2019141139 A | 8/2019 |

OTHER PUBLICATIONS

StarCraft 2—Basics—Unit Movement | WikiGameGuides—YouTube, https://www.youtube.com/watch?v=fslv2QWh3EQ, published on Aug. 19, 2010.*
1st Office Action dated Feb. 20, 2021 of Chinese Application No. 202010642984.9.
International Search Report dated Jun. 18, 2021 of International Application No. PCT/CN2021/081063.
Implementing an Automatic Navigation System using Unity3D, Wang Zhi-gang, published on Dec. 31, 2019.

* cited by examiner

In response to a first touch operation acting on a movement control area, control a first virtual character to move in a game scene —101

When the first touch operation satisfies a trigger condition, provide at least one position identifier in a designated area of a graphical user interface, the position identifier corresponding to a position in the game scene —102

Determine a first target position identifier from the at least one position identifier —103

Control the first virtual character to automatically find a path to a position corresponding to the first target position identifier in the game scene —104

FIG.1

PATHFINDING CONTROL METHOD AND DEVICE IN GAME

CROSS REFERENCE

The present disclosure is a National Stage of International Application No. PCT/CN2021/081063 filed on Mar. 16, 2021, which claims priority to Chinese Patent Application No. 202010642984.9 entitled "Pathfinding control method and apparatus in game", filed on Jul. 6, 2020, and both the entire contents of which are incorporated herein by reference.

TECHNICAL FIELD

The present disclosure relates to the technical field of games, in particular to a pathfinding control method in a game, and a pathfinding control apparatus in a game.

BACKGROUND

In some games, an automatic pathfinding function is provided, such as automatic pathfinding to the task location after the player clicks on the task, and at the same time, marking the target location on the large map is also a high-frequency routine operation. However, the organic integration of the two to optimize the design of the player's automatic pathfinding for specific target points is not provided.

It should be noted that the information disclosed in the above Background is only for enhancement of understanding of the background of the present disclosure, and therefore may contain information that does not form the prior art that is already known to a person of ordinary skill in the art.

SUMMARY

According to some embodiments of the present disclosure, there is provided a method for controlling pathfinding in a game, where a graphical user interface is provided by a mobile terminal, a content displayed on the graphical user interface includes at least part of a game scene and a first virtual character located in the game scene, the graphical user interface provides a movement control area, and the method includes:
  controlling the first virtual character to move in the game scene, in response to a first touch operation acting on the movement control area;
  providing at least one position identifier in a designated area of the graphical user interface in response to determining that the first touch operation satisfies a trigger condition, where the position identifier corresponding to a position in the game scene;
  determining a first target position identifier from the at least one position identifier; and
  controlling the first virtual character to perform automatic pathfinding to a position corresponding to the first target position identifier in the game scene.

According to some embodiments of the present disclosure, there is provided an apparatus for controlling pathfinding in a game, where a graphical user interface is provided by a mobile terminal, a content displayed on the graphical user interface includes at least part of a game scene and a first virtual character located in the game scene, the graphical user interface provides a movement control area, and the apparatus includes:
  a movement control module, configured to control the first virtual character to move in the game scene in response to a first touch operation acting on the movement control area;
  a position identifier providing module, configured to provide at least one position identifier in a designated area of the graphical user interface in response to determining that the first touch operation satisfies a trigger condition, the position identifier corresponding to a position in the game scene;
  a position identifier determination module, configured to determine a first target position identifier from the at least one position identifier;
  an automatic pathfinding control module, configured to control the first virtual character to perform automatic pathfinding to a position corresponding to the first target position identifier in the game scene.

According to some embodiments of the present disclosure, there is provided an electronic device, comprising:
  one or more processors; and
  one or more machine-readable mediums with an instruction stored thereon, when executed by the one or more processors, enabling the electronic device to perform the method of any of embodiments of the present disclosure.

According to some embodiments of the present disclosure, there is provided a computer-readable storage medium with an instruction stored thereon, when executed by one or more processors, enabling the processors to perform the method of any of embodiments of the present disclosure.

BRIEF DESCRIPTION OF THE DRAWINGS

FIG. 1 is a flow chart of steps of a method for controlling pathfinding in a game according to an embodiment of the present disclosure;

DETAILED DESCRIPTION

Figure 2:
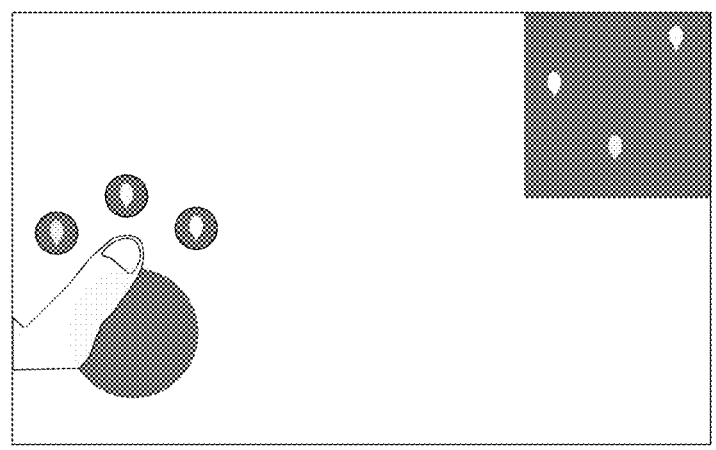
FIG. 2 is a schematic diagram of providing at least one position identifier in a designated area according to an embodiment of the present disclosure.

At present, there are two main schemes for automatic pathfinding. One scheme is: clicking a position identifier or virtual character logo in the map to perform automatic pathfinding. However, after the pathfinding state is interrupted, the map needs to be reopened for operation, which will interrupt the player's current game behavior and reduce the player's game experience. Moreover, when there are multiple marked target points, fast switching cannot be performed, and the map needs to be continuously opened and closed for switching operation. The other solution is: binding the automatic pathfinding to the identifier, where the automatic pathfinding starts after identifying a position on the map, and the identifier disappears when interrupting the automatic pathfinding. However, this solution can easily lead to an incorrect operation. Once the automatic pathfinding is interrupted by the incorrect operation, it is needed to reopen the map to perform repetitive identifying and pathfinding operations, which resulting a poor experience. Moreover, it is impossible to identify multiple positions on the map, because binding new identifiers will interrupt the original pathfinding. The freedom of the game is not high. After being identified, it can only perform automatic pathfinding. Once it is interrupted, it needs to be identified again.

In view of the above problems, embodiments of the present disclosure are proposed to provide a method for controlling pathfinding in a game and a corresponding apparatus for controlling pathfinding in a game that overcome or at least partially solve the problems mentioned above.

In order to make the above objects, features and advantages of the present disclosure more clearly understood, the present disclosure will be described in further detail below with reference to the accompanying drawings and specific embodiments.

In some embodiments of the present disclosure, the method for controlling pathfinding in a game may run on a terminal device or a server. The terminal device may be a local terminal device. When the method for controlling pathfinding in the game runs on the server, the method for controlling pathfinding in the game can be implemented and executed based on a cloud interaction system, where the cloud interaction system includes a server and a client device.

In some embodiments, various cloud applications, such as cloud game, can be run under the cloud interaction system. Taking cloud game as an example, cloud game refers to a game mode based on cloud computing. Under the running mode of the cloud game, the running body of the game program and the presentation body of the game screen are separated. The storage and operation of the method for controlling pathfinding in the game are completed on the cloud game server. The client device is used for receiving, transmitting data and presenting the game scene. For example, the client device can be a display device with data transmission function close to the user side, such as a mobile terminal, a TV, a computer, a handheld computer, etc. The terminal device for running the method for controlling pathfinding in the game is a cloud game server in the cloud. When playing the game, the player operates the client device to send operation instructions to the cloud game server; the cloud game server runs the game according to the operation instructions, encodes and compresses the game screen and other data, returns it to the client device through the network, and finally decode and output the game screen through the client device.

In some embodiments, the terminal device may be a local terminal device. Taking a game as an example, the local terminal device stores a game program and is used to present a game screen. The local terminal device is used to interact with the player through a graphical user interface. That is, conventionally, the game program is downloaded, installed and executed through an electronic device. The local terminal device may provide the graphical user interface to the player in various ways, for example, it may be rendered and displayed on the display screen of the terminal, or provided to the player through holographic projection. For example, the local terminal device may include a display screen for presenting a graphical user interface, the graphical user interface including game screens, and a processor for running the game, generating the graphical user interface, and controlling the graphical user interface display on the display.

Referring to FIG. 1, a flow chart of steps of a method for controlling pathfinding in a game according to an embodiment of the present disclosure is shown. A graphical user interface is provided through a mobile terminal, and a content displayed on the graphical user interface includes at least part of the game scene and a first virtual character located in the game scene, the graphical user interface provides a movement control area. The method may specifically include the following steps.

Step 101, in response to a first touch operation acting on the movement control area, the first virtual character is controlled to move in the game scene.

It should be noted that the mobile terminal may be the aforementioned local terminal device, or may be the aforementioned client device in the cloud interaction system. The operating system of the mobile terminal may include Android, IOS, Windows Phone, Windows, etc., and can generally support the running of various game applications.

By running a game application on the mobile terminal and rendering it on the display of the mobile terminal to obtain a graphical user interface, the content displayed on the graphical user interface at least partially includes a part or all of the game scene, and the specific shape of the game scene may be a square, or other shapes (e.g., circular, etc.).

Specifically, the game scene may include a first virtual character, the first virtual character may be a game virtual character controlled by a player through a mobile terminal, and may be presented through a graphical user interface. The presented content may include the entirety of the first virtual character or a part of the first virtual character. For example, in a third-person game, the content presented by the graphical user interface may include the entirety of the first virtual character; or, in a first-person game, the content presented by the graphical user interface may include part or local of the first virtual character. In addition, the game scene may also include at least one virtual object, and the virtual object may be a game virtual character controlled by an enemy player in the game, or anon-practicing character (NPC) preset by the game developer in a specific game scene.

A movement control area may be provided in the graphical user interface, and the player may operate in the movement control area to control the movement of the first virtual character. Optionally, a virtual rocker control may be included in the movement control area, and the virtual rocker control has an operable joystick. The player can adjust the movement direction of the first virtual character by rotating the joystick, and control the first virtual character to move according to the movement direction.

When the player needs to control the first virtual character in the game scene to move, the first touch operation can be performed on the movement control area of the graphical user interface. The first touch operation refers to the operation for controlling the first virtual character to move. After receiving the first touch operation acting on the movement control area, the game application can respond to the first touch operation and control the first virtual character to move in the game scene. Specifically, the movement direction can be determined according to the first touch operation, and the first virtual character is controlled to move according to the movement direction in the game scene.

Step 102, when the first touch operation satisfies the trigger condition, at least one position identifier is provided in a designated area of the graphical user interface, and the position identifier corresponds to a position in the game scene.

In order to quickly manipulate the virtual character to perform automatic pathfinding, in some embodiments of the present disclosure, the control operation of automatic pathfinding is combined with the first touch operation on the movement control area, so that the position of the automatic pathfinding is directly selected by the first touch operation acting on the movement control area.

Specifically, a trigger condition can be set, and it can be detected in real time that whether the first touch operation satisfies the trigger condition or not. When the first touch operation satisfies the trigger condition, it can be considered that the player needs to select the position of automatic pathfinding, then at least one position identifier is provided in the designated area of the graphical user interface, and the position identifier corresponds to the position in the game scene and is used to represent the mark corresponding to the position in the scene. The designated area can be a pre-set area in the graphical user interface for displaying the position identifier. As shown in FIG. 2, the designated area can be an arc-shaped area located above the movement control area, and the designated area includes three position identifiers. In specific implementations, in order to distinguish the position identifiers, the shape and/or color of each position identifier can be set to be not the same.

Step 103, a first target position identifier is determined from the at least one position identifier.

After the position identifier is provided, a first target position identifier may be further determined from at least one position identifier according to the first touch operation, and the first target position identifier may be a position identifier corresponding to a position used to control the first virtual character to perform automatic pathfinding.

Figure 3:
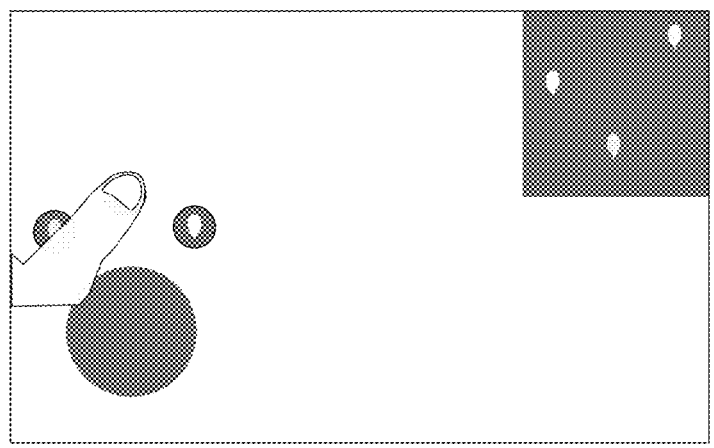
FIG. 3 is a schematic diagram of determining a first target position identifier according to an embodiment of the present disclosure.

Specifically, the first touch operation may have a corresponding touch point, so that the first target position identifier is determined from the at least one position identifier according to the position where the touch point is located or according to the path passed by the touch point. As shown in FIG. 3, a position identifier located in the middle is determined as the first target position identifier from the at least one position identifier.

Step 104, the first virtual character is controlled to perform automatic pathfinding to a position corresponding to the first target position identifier in the game scene.

After the first target position identifier is determined, the first virtual character can be controlled to perform automatic pathfinding in the game scene to a position corresponding to the first target position identifier.

By combining the control operation of automatic pathfinding with the first touch operation on the movement control area, when the first touch operation satisfies the trigger condition, the first target position identifier can be selected from the designated area for automatic pathfinding. At the same time, the position of the automatic pathfinding can be set in advance, and it does not need to open the game scene thumbnail again for operations such as pathfinding and switching the destination, so as to avoid interrupting the player's current game behavior, reduce the occlusion of the scene when opening the game scene thumbnail and selecting the position of automatic pathfinding, and improve the player's gaming experience. Moreover, since the automatic pathfinding state can be quickly entered again, the player can interrupt the currently ongoing automatic pathfinding at will, thereby improving the player's freedom of gaming.

In some embodiments of the present disclosure, the step 101 may include the following sub-steps.

In response to a first touch operation acting on the movement control area, a movement direction is determined, and the first virtual character is controlled to move in the game scene according to the movement direction.

Specifically, the first touch operation may have a touch point, the position of the touch point in the movement control area may indicate the movement direction, the movement direction may be determined according to the position of the touch point, and the first virtual character may be further controlled to move according to the movement direction in the game scene.

As an example, the movement control area may include a virtual rocker control, and a joystick is included in the virtual rocker control. The first touch operation is performed in the virtual rocker control, the joystick in the virtual rocker control may rotate following the movement of the touch point, and the position of the joystick in the virtual rocker control can indicate the movement direction. For example, if the joystick is in the true north direction in the virtual rocker control, it can be determined that the movement direction is the true north direction that the virtual character currently faces.

In some embodiments of the present disclosure, the first touch operation includes a sliding operation, and the sliding operation includes any one of a direct sliding operation, a sliding operation after a long press, or a sliding operation after a heavy press, where, the sliding operation has a corresponding touch point.

Specifically, the first touch operation may include a sliding operation, the sliding operation has a corresponding touch point, and the touch position of the operation medium on the graphical user interface is the touch point. The sliding operation includes any one of a direct sliding operation, a sliding operation after a long press, or a sliding operation after a heavy press. The direct sliding operation refers to the operation of sliding the operation medium directly on the display screen of the mobile terminal. The sliding operation after a long press refers to the operation that the operation medium first presses the display screen of the mobile terminal for a preset duration (the preset duration can be a preset time length, such as 2 seconds), and then slides on the display screen of the mobile terminal. The sliding operation after a heavy press refers to the operation that after the pressure value of the operation medium pressing the display screen of the mobile terminal reaches a preset pressure (the preset pressure may be a preset pressure value), the operation medium slides on the display screen of the mobile terminal.

In some embodiments of the present disclosure, the trigger condition includes: detecting that the touch point of the sliding operation slides out of the movement control area, or the touch point moves to a specified position, or a moving distance of the touch point is greater than a preset distance threshold, or a moving speed of the touch point is greater than a preset speed threshold, or a pressing time of the touch point is greater than a preset time threshold, or a pressing pressure of the touch point is greater than a preset pressure threshold.

The first touch operation includes a sliding operation, and the sliding operation has a corresponding touch point. In some embodiments of the present disclosure, a trigger condition may be set which includes: detecting that the touch point of the sliding operation slides out of the movement control area, or the touch point moves to a specified position, or a moving distance of the touch point is greater than a preset distance threshold, or a moving speed of the touch point is greater than a preset speed threshold, or a pressing time of the touch point is greater than a preset time threshold, or a pressing pressure of the touch point is greater than a preset pressure threshold. The specified position may be a preset position. For example, the specified position is an edge position of the movement control area. When the touch point moves to the edge position of the movement control area, it is considered that the first touch operation satisfies the trigger condition. The preset distance threshold may be a preset critical value of distance. For example, the preset distance threshold is 10 cm. When the moving distance of the touch point is greater than 10 cm, it is considered that the first touch operation satisfies the trigger condition. The preset speed threshold may be a preset critical value of speed. For example, the preset speed threshold is 10 cm per second. When the moving speed of the touch point is greater than 10 cm per second, it is considered that the first touch operation satisfies the trigger condition. The preset time threshold may be a preset critical value of pressing time length. For example, the preset time threshold is 2 seconds. When the pressing time of the touch point is more than 2 seconds, it is considered that the first touch operation satisfies the trigger condition. The preset pressure threshold may be a preset critical value of pressure. For example, the preset pressure threshold is 10 Newtons. When the pressing pressure of the touch point is greater than 10 Newtons, it is considered that the first touch operation satisfies the trigger condition.

In some embodiments of the present disclosure, the designated area is located above the movement control area. Specifically, the designated area may be located at a certain distance from the upper edge of the movement control area. For example, the designated area is located at 5 cm from the upper edge of the movement control area.

In some embodiments of the present disclosure, the graphical user interface further provides a game scene thumbnail, and the designated area is a display area other than the game scene thumbnail in the graphical user interface.

The game scene thumbnail can be set at a specified position in the graphical user interface, such as the upper left corner of the graphical user interface, or the upper right corner, and so on. The designated area may be a display area other than the game scene thumbnail in the graphical user interface.

In addition, the graphical user interface may further include a setting entry, through which the player can freely set the position of the designated area in the graphical user interface.

In some embodiments of the present disclosure, the position identifier includes a static position identifier, and the static position identifier corresponds to a static location in the game scene.

In some embodiments of the present disclosure, the position identifier may include a static position identifier, and the static position identifier corresponds to a static location in the game scene, that is, a fixed location in the game scene, such as the position of a certain store in the game scene.

In some embodiments of the present disclosure, the position identifier includes a dynamic position identifier, and the dynamic position identifier corresponds to the dynamic position of a second virtual character in the game scene.

In some embodiments of the present disclosure, the game scene may further include a second virtual character. The second virtual character may be a game virtual character in the same team as the first virtual character in the game scene (i.e., a teammate of the first virtual character). The second virtual character may also be an NPC in the game scene.

In some games, the player needs to go to the teammate's position to complete a certain task, or, when performing the task, the player needs to interact with the NPC in the game scene. Therefore, a dynamic position identifier can be set to correspond to the dynamic position of the second virtual character in the game scene, so that the player can quickly perform automatic pathfinding to the dynamic position of the second virtual character in the game scene.

Figure 4:
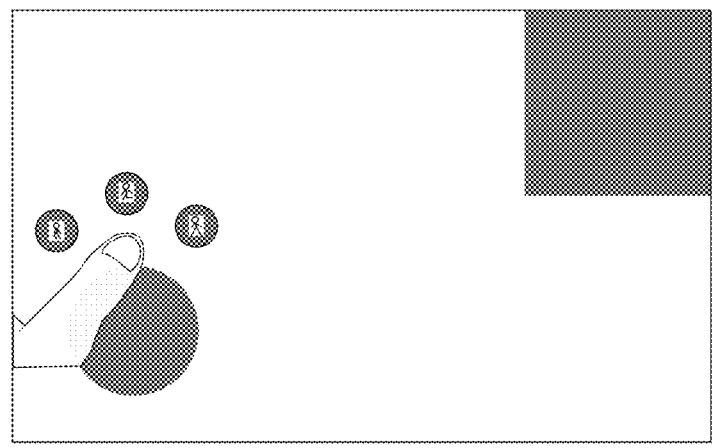
FIG. 4 is a schematic diagram of a position identifier being the avatar of the second virtual character according to an embodiment of the present disclosure.

In some embodiments of the present disclosure, the position identifier includes an avatar of the second virtual character. When the position identifier corresponds to the dynamic position of the second virtual character in the game scene, the position identifier may be the avatar of the second virtual character, so that the player can better distinguish these position identifiers, further improving the speed of selecting the position of the automatic pathfinding. As shown in FIG. 4, in the arc area above the movement control area, there are three position identifiers, and the three position identifiers correspond to the avatars of three second virtual characters respectively.

In some embodiments of the present disclosure, the method may further include the following steps.

According to the position or state attribute of the second virtual character, the avatar of the second virtual character is determined as the dynamic position identifier.

Optionally, in some games, it may be determined whether to determine the avatar of the second virtual character as the dynamic position identifier based on that whether the position of the second virtual character enters a specific area or not. For example, when the second virtual object (such as a teammate) enters a wild area, a dynamic position identifier may be set to correspond to the dynamic position of the second virtual character in the game scene, and the player can quickly perform pathfinding to the dynamic position of the second virtual character for rescue or cooperative operations. Optionally, it may also be determined whether to determine the avatar of the second virtual character as the dynamic position identifier according to the status attributes of the second virtual character. The above-mentioned status attributes may include the second virtual character's blood volume, skill CD (cool down) time, level, being attacked or attacking the enemy, etc. For example, when the second virtual character is in the residual blood state (the blood volume is lower than a specified value), the dynamic position identifier may be set to correspond to the dynamic position of the second virtual character in the game scene, and players can quickly perform pathfinding to the dynamic position of the second virtual character to rescue or cooperate with the battle.

In some embodiments of the present disclosure, when the position of the first virtual character and the position of the second virtual character satisfy a preset positional relationship, or when the second virtual character is under a virtual attack, the avatar of the second virtual character is determined as a dynamic position identifier.

The preset positional relationship may be a preset relationship between the positions of the two virtual characters. For example, the preset positional relationship is the rear, the left side or the right side, and the like. In some games, the player needs to go to the position of a teammate to complete a certain task. If the second virtual character is located at the rear of the first virtual character controlled by the player and satisfies the preset positional relationship, a dynamic position identifier can be set to correspond to the dynamic position of the second virtual character in the game scene. In this way, the player can find the second virtual character in the non-visual area in time, and quickly perform pathfinding to the dynamic position of the second virtual character in the game scene. In some other games, when the second virtual character is under virtual attack by an enemy unit, a dynamic position identifier can be set to correspond to the dynamic position of the second virtual character in the game scene, so that when the teammate are in danger, the player can quickly perform pathfinding to the dynamic position of the second virtual character for rescue, which improves the game experience.

In some embodiments of the present disclosure, the graphical user interface further provides a game scene thumbnail.

Before the step 102, the method may further include the following steps:
  at least one pathfinding position is selected on the game scene thumbnail.

Specifically, the player may perform a trigger operation on the game scene thumbnail, and the trigger operation may refer to an operation for selecting a pathfinding position, such as a click operation, a long-press operation, and the like. After receiving the trigger operation acting on the game scene thumbnail, the game application may respond to the trigger operation, and select at least one pathfinding position on the game scene thumbnail according to the trigger position in the trigger operation. Each of the selected pathfinding positions may have a one-to-one corresponding position identifier, and the position identifiers corresponding to these pathfinding positions may be displayed on the game scene thumbnail.

Figure 5:
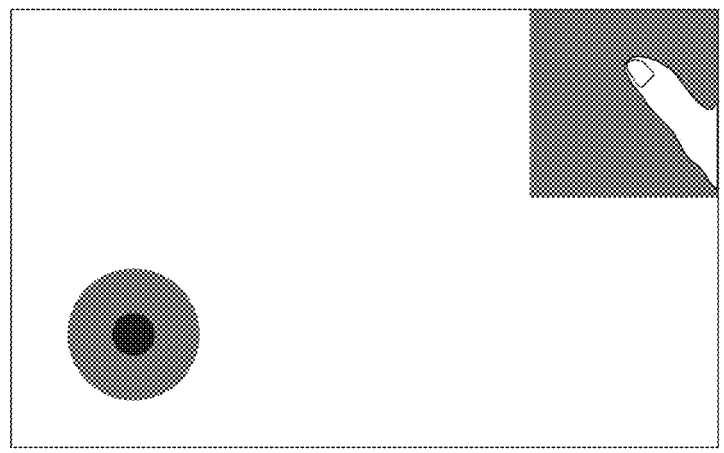
FIG. 5 is a schematic diagram of a graphical user interface including game scene thumbnail corresponding to the game scene according to an embodiment of the present disclosure.
Figure 6:
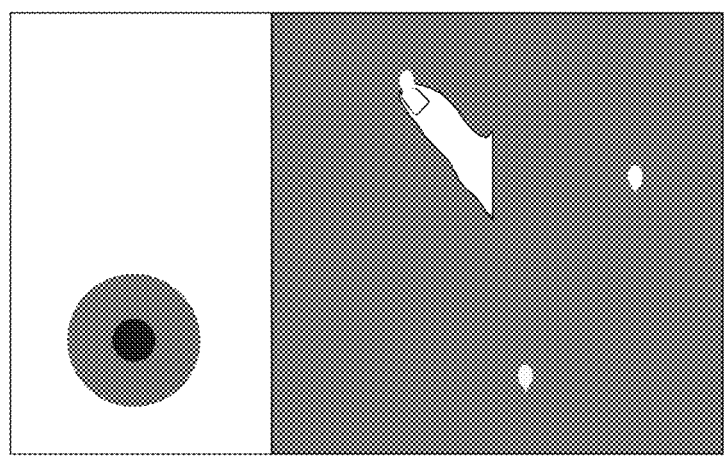
FIG. 6 is a schematic diagram of an expanded game scene thumbnail according to an embodiment of the present disclosure.

As shown in FIG. 5, the graphical user interface includes a movement control area (the movement control area has a virtual rocker control), and a game scene thumbnail corresponding to the game scene. The game scene thumbnail is located in the upper right corner of the graphical user interface and is displayed as a mini map. The player can expand the game scene thumbnail by a trigger operation of the game scene thumbnail. The expanded game scene thumbnail is shown as FIG. 6. In FIG. 6, the player performs three trigger operations on the expanded game scene thumbnail and sets three pathfinding positions.

Figure 7:
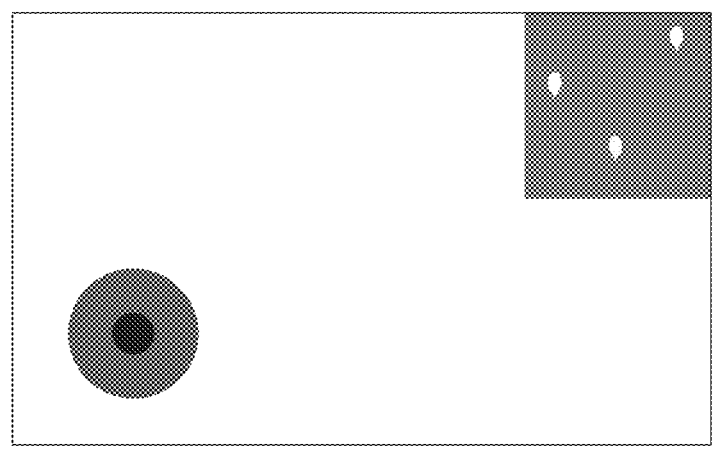
FIG. 7 is a schematic diagram of closing the game scene thumbnail as shown in FIG. 5 according to an embodiment of the present disclosure.

After setting at least one pathfinding position, the player can close the game scene thumbnail by clicking on the non-game scene thumbnail area on the graphical user interface. Or, a close control is contained in the expanded game scene thumbnail, and the player can click the close control to close the game scene thumbnail. FIG. 7 shows a schematic diagram of closing the game scene thumbnail as shown in FIG. 6.

In some embodiments of the present disclosure, after at least one pathfinding position is selected, if it is detected that the game scene thumbnail is switched from an expanded state to a non-expanded state, a position identifier in one-to-one correspondence to each pathfinding position is provided in the designated area of the graphical user interface. Therefore, the player can select a position identifier from the designated area, and control the first virtual character to perform automatic pathfinding to the position corresponding to the position identifier, further accelerating the speed of controlling the first virtual character to perform automatic pathfinding.

In some embodiments of the present disclosure, the step 102 may include the following sub-steps:
  when the first touch operation satisfies the trigger condition, a position identifier in one-to-one correspondence to each of the pathfinding positions is provided in the designated area of the graphical user interface.

Specifically, it is detected in real time that whether the first touch operation satisfies the trigger condition or not. When the first touch operation satisfies the trigger condition, a position identifier in one-to-one correspondence to each pathfinding position can be provided in the designated area of the graphical user interface, so that the player can select the position identifier corresponding to the pathfinding position from the designated area to perform automatic pathfinding to the selected pathfinding position.

In some embodiments of the present disclosure, the method may further include the following steps:
  in response to a trigger operation acting on the at least one pathfinding position, a triggered pathfinding position is determined from the at least one pathfinding position, and the triggered pathfinding position is deleted; the position identifier corresponding to the triggered pathfinding location is deleted from the designated area.

Specifically, when the player needs to delete the selected pathfinding position, a trigger operation may be performed on at least one pathfinding position in the game scene thumbnail, and the trigger operation may include a click operation, a long press operation, and the like. After receiving the trigger operation acting on at least one pathfinding position, the game application can respond to the trigger operation, determine the triggered pathfinding position from the at least one pathfinding position, and delete the triggered pathfinding position from the at least one pathfinding position. When deleting the triggered pathfinding position, the position identifier corresponding to the triggered pathfinding position in the game scene thumbnail can be hidden. Further, the position identifier corresponding to the triggered pathfinding position is deleted from the designated area.

In some embodiments of the present disclosure, the step 103 may include the following sub-steps:
  in response to the end of the first touch operation, the first target position identifier is determined from the at least one position identifier.

Specifically, when it is detected that the operation medium (the medium used for inputting device signals, such as a finger or a stylus etc.) for the first touch operation leaves the graphical user interface, it is considered that an operation of the end of the first touch operation is received, the first target position identifier may be determined from the at least one position identifier in response to the end of the first touch operation. In a specific implementation, the touch point when the end of the first touch operation is received may be determined, and the first target position identifier may be determined from at least one position identifier according to the touch point. Or, the path passed by the touch point of the first touch operation during the first touch operation can be determined, and the first target position identifier can be determined from at least one position identifier according to the path.

When the first virtual character is controlled to move through the first touch operation, it can be detected in real time whether the first touch operation satisfies the trigger condition or not. When the first touch operation satisfies the trigger condition, it is considered that the player needs to perform automatic pathfinding. At this time, at least one position identifier is provided in the designated area on the graphical user interface for the player to select. The player continues to select the position identifier corresponding to the pathfinding location through the first touch operation, and further, can determine the first target position identifier from at least one position identifier in responding to the end of the first touch operation, so that the first virtual character can be controlled to perform automatic pathfinding to the position corresponding to the first target position identifier. Therefore, a series of operations of triggering automatic pathfinding, selecting a specific automatic pathfinding position, and controlling the first virtual character to perform automatic pathfinding can be completed only through the first touch operation, further accelerating the speed of controlling the first virtual character to perform automatic pathfinding and improving the player's gaming experience.

In some embodiments of the present disclosure, the determining the first target position identifier from the at least one position identifier includes:

the first target position identifier is determined from the at least one position identifier according to the touch point of the first touch operation.

Specifically, the first touch operation has a corresponding touch point, and when the first touch operation satisfies the trigger condition, the first target position identifier may be determined from at least one position identifier according to the touch point of the first touch operation.

In some embodiments of the present disclosure, the determining the first target position identifier from the at least one position identifier according to the touch point of the first touch operation includes:

according to the touch point of the first touch operation, the position identifier corresponding to the touch point is determined as the first target position identifier from the at least one position identifier; or, according to the touch point of the first touch operation, any position identifier corresponding to the path passed by the touch point is determined as the first target position identifier from the at least one position identifier.

Specifically, when the first touch operation is continuously performed, the touch point of the first touch operation may be continuously moved, and when the first target position identifier needs to be determined, the position identifier corresponding to the touch point may be determined as the first target position identifier from the at least one position identifier according to the last position of the touch point of the first touch operation.

Alternatively, when the first target position identifier needs to be determined, any position identifier corresponding to the path passed by the touch point may be determined as the first target position identifier from the at least one position identifier according to the touch point of the first touch operation. In a specific implementation, when the path passed by the touch point has multiple corresponding position identifiers, one position identifier may be randomly determined as the first target position identifier from the multiple passed position identifiers. When the path passed by the touch point has only one corresponding position identifier, the position identifier may be determined as the first target position identifier.

In some embodiments of the present disclosure, the determining the first target position identifier according to the touch point of the first touch operation includes:

according to the position or the movement direction of the touch point, the first target position identifier is determined from the at least one position identifier.

Specifically, according to the position of the touch point, the position identifier corresponding to the position can be determined as the first target position identifier from at least one position identifier, or the position identifier closest to the position can be determined as the first target position identifier from the at least one position identifier. In addition, according to the movement direction of the touch point, the position identifier pointed by the movement direction can also be determined as the first target position identifier from at least one position identifier, so that the first target position identifier may be determined without the touch point of the first touch operation moving to the position of position identifier, further accelerating the speed of controlling the first virtual character to perform automatic pathfinding.

In some embodiments of the present disclosure, the method may further include the following steps:

during the process of automatic pathfinding, in response to a second touch operation acting on the movement control area, the first virtual character is controlled to stop the automatic pathfinding.

Specifically, in the process of controlling the first virtual character to perform automatic pathfinding, the player may interrupt the automatic pathfinding by performing a second touch operation on the movement control area. The second touch operation may be an operation for interrupting the automatic pathfinding, for example, a click operation, a double-click operation, etc., which is not limited in the embodiments of the present disclosure. The trigger operation may act on the movement control area, thereby the automatic pathfinding of the virtual character is prevented from being interrupted by mistakenly touch on other areas of the graphical user interface when the player does not need to interrupt the automatic pathfinding of the virtual character, thereby reducing the probability of incorrect operation.

The game application may, after receiving the second touch operation acting on the movement control area, respond to the second touch operation, and control the virtual character to stop automatic pathfinding to the position corresponding to the first target position identifier.

In some embodiments of the present disclosure, the method may further include the following steps:

prompt information for the automatic pathfinding is displayed in the designated area.

Figure 8:
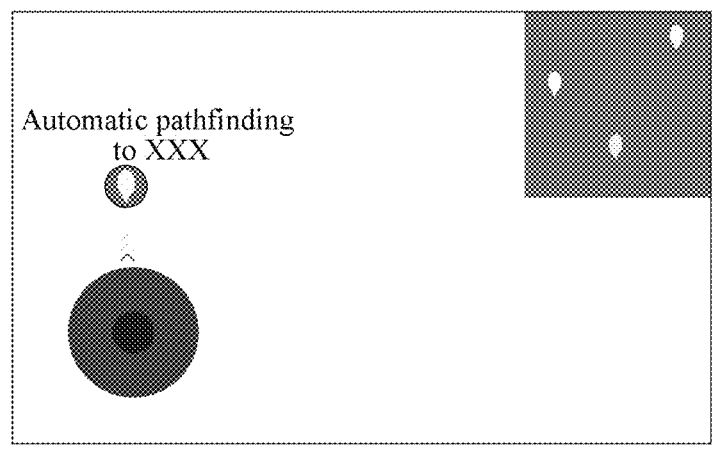
FIG. 8 is a schematic diagram of displaying automatic pathfinding prompt information in a designated area according to an embodiment of the present disclosure.

Specifically, after controlling the first virtual character to perform automatic pathfinding, prompt information for the automatic pathfinding may be displayed in the designated area. The prompt information may include the name of the position corresponding to the first target position identifier to remind the position of the automatic pathfinding to the player. location, avoiding to a wrong position and causing unnecessary time consumption. For example, the prompt information may be "Automatic pathfinding to the airport". As shown in FIG. 8, when the first virtual character is controlled to perform automatic pathfinding, the prompt information for the automatic pathfinding displayed in the designated area is "Automatic pathfinding to XXX".

In some embodiments of the present disclosure, the method may further include the following steps:

in response to a third touch operation acting on the designated area, a second target position identifier is determined from the remaining position identifiers, where the remaining position identifiers are those other than the first target position identifier among the at least one position identifiers.

Specifically, in the process of controlling the first virtual character to perform automatic pathfinding, the player may perform a third touch operation on the designated area to switch the position of the automatic pathfinding. The third touch operation may refer to an operation for switching the position of automatic pathfinding. For example, the third touch operation is a double-click operation, a sliding operation, or a click operation etc., which is not limited in the embodiments of the present disclosure.

After receiving the third touch operation acting on the designated area, the game application may respond to the third touch operation, and determine the second target position identifier from the remaining position identifiers, where the remaining position identifiers are those other than the first target position identifier among the at least one position identifiers. As an example, in the designated area, there are four position identifiers, namely A, B, C, and D. Assuming that the first target position identifier is A, the remaining position identifiers are B, C, and D.

In the process of controlling the first virtual character to perform automatic pathfinding, the player can directly select the second target position identifier by performing the third touch operation in the designated area, so that the position to which the first virtual character will perform automatic pathfinding can be controlled and switched from the position corresponding to the first target position identifier to the position corresponding to the second target position identifier, so that when switching the position of automatic pathfinding, it is not necessary to open the game scene thumbnail again for selection, which avoids interrupting the current game behavior of the player, reduces the occlusion of the scene when opening the game scene thumbnail to select the position of automatic pathfinding, solves the problem that the position of automatic pathfinding cannot be switched quickly, and improves the game experience of the player. Moreover, since the automatic pathfinding state can be quickly returned again, the player can interrupt the currently ongoing automatic pathfinding at will, thereby improving the player's freedom of gaming.

It should be noted that, for the sake of simple description, the method embodiments are described as a series of action combinations, but those skilled in the art should know that the embodiments of the present disclosure are not limited by the described action sequences, because according to embodiments of the present disclosure, certain steps may be performed in other sequences or simultaneously. Secondly, those skilled in the art should also know that the embodiments described in the specification are all preferred embodiments, and the actions involved are not necessarily required by the embodiments of the present disclosure.

Figure 9:
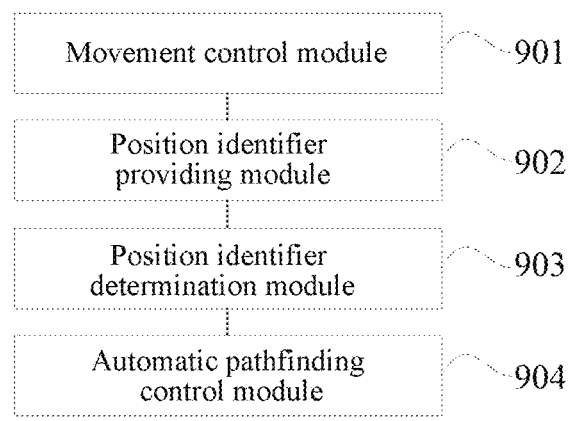
FIG. 9 is a structural block diagram of an apparatus of controlling pathfinding in a game according to an embodiment of the present disclosure.

Referring to FIG. 9, a structural block diagram of an apparatus for controlling pathfinding in a game according to an embodiment of the present disclosure is shown. A graphical user interface is provided through a mobile terminal, and the content displayed on the graphical user interface includes at least part of the game scene and a first virtual character in the game scene, and the graphical user interface provides a movement control area. The apparatus may specifically include the following modules:

a movement control module 901, configured to control the first virtual character to move in the game scene in response to a first touch operation acting on the movement control area;

a position identifier providing module 902, configured to provide at least one position identifier in a designated area of the graphical user interface in response to determining that the first touch operation satisfies a trigger condition, where the position identifier corresponds to a position in the game scene;

a position identifier determination module 903, configured to determine a first target position identifier from the at least one position identifier;

an automatic pathfinding control module 904, configured to control the first virtual character to perform automatic pathfinding a position corresponding to the first target position identifier in the game scene.

In some embodiments of the present disclosure, the movement control module 901 includes:

a movement control sub-module, configured to determine a movement direction in response to a first touch operation acting on the movement control area, and control the first virtual character to move in the game scene according to the movement direction.

In some embodiments of the present disclosure, the first touch operation includes a sliding operation, and the sliding operation includes any one of a direct sliding operation, a sliding operation after a long press, or a sliding operation after a heavy press, where the sliding operation has a corresponding touch point.

In some embodiments of the present disclosure, the trigger condition includes: detecting that the touch point of the sliding operation slides out of the movement control area, or the touch point moves to a specified position, or a moving distance of the touch point is greater than a preset distance threshold, or a moving speed of the touch point is greater than a preset speed threshold, or a pressing time of the touch point is greater than a preset time threshold, or a pressing pressure of the touch point is greater than a preset pressure threshold.

In some embodiments of the present disclosure, the designated area is located above the movement control area.

In some embodiments of the present disclosure, the graphical user interface further provides a game scene thumbnail, and the designated area is a display area other than the game scene thumbnail in the graphical user interface.

In some embodiments of the present disclosure, the position identifier includes a static position identifier, and the static position identifier corresponds to a static position in the game scene.

In some embodiments of the present disclosure, the position identifier includes a dynamic position identifier, and the dynamic position identifier corresponds to the dynamic location of a second virtual character in the game scene.

In some embodiments of the present disclosure, the position identifier includes an avatar of the second virtual character.

In some embodiments of the present disclosure, the graphical user interface further provides a game scene thumbnail, and the device further includes:

a pathfinding position determination module, configured to determine at least one pathfinding position on the game scene thumbnail.

The position identifier providing module 902 includes:

a position identifier providing sub-module, configured to provide a position identifier in one-to-one correspondence to each of the pathfinding position in the designated area of the graphical user interface when the first touch operation satisfies a trigger condition.

In some embodiments of the present disclosure, it also includes:

a pathfinding position deletion module, configured to determine a triggered pathfinding position from the at least one pathfinding position in response to a trigger operation acting on the at least one pathfinding position, and delete the triggered pathfinding position;

a position identifier deletion module, configured to delete the position identifier corresponding to the triggered pathfinding location from the designated area.

In some embodiments of the present disclosure, the position identifier determination module 903 includes:

a first position identifier determination submodule, configured to determine the first target position identifier from the at least one position identifier in response to the end of the first touch operation.

In some embodiments of the present disclosure, the position identifier determination module 903 includes:

a second position identifier determination submodule, configured to determine the first target position identifier from the at least one position identifier according to the touch point of the first touch operation.

In some embodiments of the present disclosure, the second position identifier determination submodule includes:

a first position identifier determination unit, configured to determine a position identifier corresponding to the touch point as a first target position identifier from the at least one position identifier, according to the touch point of the first touch operation; or a second position identifier determination unit, configured to determine any position identifier corresponding to the path passed by the touch point as the first target position identifier position identifier from the at least one position identifier according to the touch point of the first touch operation.

In some embodiments of the present disclosure, the second position identifier determination submodule includes:

a third position identifier determining unit, configured to determine the first target position identifier from the at least one position identifier according to the position or movement direction of the touch point.

In some embodiments of the present disclosure, the apparatus further comprises:

an automatic pathfinding stop module, configured to control the first virtual character to stop the automatic pathfinding in response to a second touch operation acting on the movement control area during the process of automatic pathfinding.

In some embodiments of the present disclosure, the apparatus further comprises:

a second position identifier determination module, configured to determine a second target position identifier from the remaining position identifier in response to a third touch operation acting on the designated area, where the remaining position identifier is a position identifier other than the first target position identifier among the at least one position identifier.

As for the apparatus embodiments, since basically similar to the method embodiments, the description is relatively simple, and reference may be made to the partial description of the method embodiments for related parts.

According to the embodiments of the present disclosure, there is also provided an electronic device, including:

one or more processors; and one or more machine-readable media, on which instructions are stored, and when the instructions are executed by the one or more processors, it enables the electronic device to perform the method of any one of the embodiments of the present disclosure.

According to the embodiments of the present disclosure, there is also provided a computer-readable storage medium, on which instructions are stored, and when the instructions are executed by one or more processors, it enables the processors to execute the method of any one of the embodiments of the present disclosure.

The various embodiments in this specification are described in a progressive manner, each embodiment focuses on the differences from other embodiments, and the same and similar parts between the various embodiments may be referred to each other.

It should be understood by those skilled in the art that the embodiments the present disclosure may be provided as a method, an apparatus, or a computer program product. Accordingly, embodiments of the present disclosure may take the form of an entirely hardware embodiment, an entirely software embodiment, or an embodiment combining software and hardware aspects. Furthermore, embodiments of the present disclosure may take the form of a computer program product implemented on one or more computer-usable storage medium (including, but not limited to, disk storage, CD-ROM, optical storage, etc.) containing computer-usable program code.

Embodiments of the present disclosure are described with reference to flowcharts and/or block diagrams of methods, terminal devices (systems), and computer program products according to embodiments of the present disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general purpose computer, special purpose computer, embedded processor or other programmable data processing terminal device to produce a machine that causes the instructions to be executed by the processor of the computer or other programmable data processing terminal device to generate means for implementing the functions specified in a process or processes of the flowcharts and/or a block or blocks of the block diagrams.

These computer program instructions may also be stored in a computer readable memory capable of directing a computer or other programmable data processing terminal device to operate in a particular manner, such that the instructions stored in the computer readable memory generate an article of manufacture including instruction means. The instruction means implement the functions specified in a process or processes of the flowcharts and/or a block or blocks of the block diagrams.

These computer program instructions can also be loaded on a computer or other programmable data processing terminal device, so that a series of operational steps are performed on the computer or other programmable terminal device to produce a computer-implemented process, thereby the instructions executed on the computer or other programmable terminal device provide steps for implementing the functions specified in a process or processes of the flowcharts and/or a block or blocks of the block diagrams.

While preferred embodiments of the embodiments of the present disclosure have been described, additional changes and modifications to these embodiments may be made by those skilled in the art once the basic inventive concepts are known. Therefore, the appended claims are intended to be construed to include the preferred embodiment as well as all changes and modifications that fall within the scope of the embodiments of the present disclosure.

Finally, it should also be noted that in this document, relational terms such as first and second are used to distinguish one entity or operation from another, and do not necessarily require or imply that there is any such actual relationship or sequence between these entities or operations. Moreover, the terms "comprising", "including" or any other variation are intended to encompass non-exclusive inclusion such that a process, method, article or terminal device that includes a list of elements includes not only those elements, but also other elements not explicitly listed, or also include elements inherent to such a process, method, article or terminal device. Without further limitation, an element defined by the phrase "comprises a . . . " does not preclude the presence of additional identical elements in the process, method, article, or terminal device that includes the element.

A method and apparatus for controlling pathfinding in a game provided by the present disclosure have been described above in detail. In this paper, specific examples are used to illustrate the principles and implementations of the present disclosure. The above description of the embodiments is used to help understand the method and core concepts of the present disclosure. Meanwhile, for those skilled in the art, according to the concept of the present disclosure, there will be changes in specific embodiments and application scope. As mentioned above, the contents of this specification should not be construed as limiting the present disclosure.

What is claimed is:

1. A method for controlling pathfinding in a game, wherein a graphical user interface is provided by a mobile terminal, a content displayed on the graphical user interface comprises at least part of a game scene and a first virtual character located in the game scene, the graphical user interface provides a movement control area, and the method comprises:
   controlling the first virtual character to move in the game scene, in response to a first touch operation acting on the movement control area;
   providing at least one position identifier in a designated area of the graphical user interface, in response to determining that the first touch operation satisfies a trigger condition, wherein the at least one position identifier corresponding to at least one position in the game scene, and the designated area is located outside the game scene;
   determining a first target position identifier from the at least one position identifier; and
   controlling the first virtual character to perform automatic pathfinding to a position corresponding to the first target position identifier in the game scene.

2. The method according to claim 1, wherein the controlling the first virtual character to move in the game scene, in response to the first touch operation acting on the movement control area comprises:
   determining a movement direction and controlling the first virtual character to move in the game scene according to the movement direction, in response to the first touch operation acting on the movement control area.

3. The method according to claim 1, wherein, the first touch operation comprises a sliding operation, and the sliding operation comprises any one of a direct sliding operation, a sliding operation after a long press, or a sliding operation after a heavy press, wherein the sliding operation comprises a corresponding touch point.

4. The method according to claim 3, wherein the trigger condition comprises: detecting that the touch point of the sliding operation slides out of the movement control area, or the touch point moves to a specified position, or a moving distance of the touch point is greater than a preset distance threshold, or a moving speed of the touch point is greater than a preset speed threshold, or a pressing time of the touch point is greater than a preset time threshold, or a pressing pressure of the touch point is greater than a preset pressure threshold.

5. The method of claim 1, wherein the designated area is located above the movement control area.

6. The method according to claim 1, wherein the graphical user interface further provides a game scene thumbnail, and the designated area comprises a display area other than the game scene thumbnail in the graphical user interface.

7. The method according to claim 1, wherein the position identifier comprises a static position identifier, and the static position identifier corresponds to a static position in the game scene.

8. The method according to claim 1, wherein the position identifier comprises a dynamic position identifier, and the dynamic position identifier corresponds to a dynamic position of a second virtual character in the game scene.

9. The method according to claim 8, wherein the position identifier comprises an avatar of the second virtual character.

10. The method according to claim 1, wherein the graphical user interface further provides a game scene thumbnail;
    the method further comprises:
    selecting at least one pathfinding position on the game scene thumbnail; and
    the providing at least one position identifier in the designated area of the graphical user interface in response to determining that the first touch operation satisfies the trigger condition comprises:
    providing a position identifier of the at least one position identifier in one-to-one correspondence to a pathfinding position of the at least one pathfinding position in the designated area of the graphical user interface in response to determining that the first touch operation satisfies the trigger condition.

11. The method of claim 10, further comprising:
    determining a triggered pathfinding position from the at least one pathfinding position and deleting the triggered pathfinding position, in response to a trigger operation acting on the at least one pathfinding position; and
    deleting a position identifier of the at least one position identifier corresponding to the triggered pathfinding position from the designated area.

12. The method according to claim 1, wherein the determining the first target position identifier from the at least one position identifier comprises:
    determining the first target position identifier from the at least one position identifier, in response to end of the first touch operation.

13. The method according to claim 1, wherein the determining the first target position identifier from the at least one position identifier comprises:
    determining the first target position identifier from the at least one position identifier according to a touch point of the first touch operation.

14. The method according to claim 13, wherein, the determining the first target position identifier from the at least one position identifier according to the touch point of the first touch operation comprises:
    determining a position identifier corresponding to the touch point as the first target position identifier from the at least one position identifier; or
    determining a position identifier corresponding to a path passed by the touch point as the first target position identifier from the at least one position identifier.

15. The method according to claim 13, wherein the determining the first target position identifier from the at least one position identifier according to the touch point of the first touch operation comprises:
   determining the first target position identifier from the at least one position identifier according to a position or a movement direction of the touch point.

16. The method according to claim 1, wherein the method further comprises:
   controlling the first virtual character to stop the automatic pathfinding in response to a second touch operation acting on the movement control area during performing the automatic pathfinding.

17. The method according to claim 1, wherein the method further comprises:
   determining a second target position identifier from a remaining position identifier, in response to a third touch operation acting on the designated area, wherein the remaining position identifier comprises a position identifier other than the first target position identifier among the at least one position identifier.

18. An electronic device, comprising:
   one or more processors; and
   one or more machine-readable mediums with an instruction stored thereon, wherein the instruction is used for, when executed by the one or more processors, enabling the electronic device to perform a method for controlling pathfinding in a game, wherein a graphical user interface is provided by a mobile terminal, a content displayed on the graphical user interface comprises at least part of a game scene and a first virtual character located in the game scene, the graphical user interface provides a movement control area, and the method comprises:
   controlling the first virtual character to move in the game scene, in response to a first touch operation acting on the movement control area;
   providing at least one position identifier in a designated area of the graphical user interface, in response to determining that the first touch operation satisfies a trigger condition, wherein the at least one position identifier corresponding to at least one position in the game scene, and the designated area is located outside the game scene;
   determining a first target position identifier from the at least one position identifier; and
   controlling the first virtual character to perform automatic pathfinding to a position corresponding to the first target position identifier in the game scene.

19. The electronic device according to claim 18, wherein, the graphical user interface further provides a game scene thumbnail, and the method further comprises:
   selecting at least one pathfinding position on the game scene thumbnail; and
   the providing at least one position identifier in the designated area of the graphical user interface in response to determining that the first touch operation satisfies the trigger condition comprises:
   providing a position identifier of the at least one position identifier in one-to-one correspondence to a pathfinding position of the at least one pathfinding position in the designated area of the graphical user interface in response to determining that the first touch operation satisfies the trigger condition.

20. A non-transitory computer-readable storage medium with an instruction stored thereon, when executed by one or more processors, enabling the processors to perform a method for controlling pathfinding in a game, wherein a graphical user interface is provided by a mobile terminal, a content displayed on the graphical user interface comprises at least part of a game scene and a first virtual character located in the game scene, the graphical user interface provides a movement control area, and the method comprises:
   controlling the first virtual character to move in the game scene, in response to a first touch operation acting on the movement control area;
   providing at least one position identifier in a designated area of the graphical user interface, in response to determining that the first touch operation satisfies a trigger condition, wherein the at least one position identifier corresponding to at least one position in the game scene, and the designated area is located outside the game scene;
   determining a first target position identifier from the at least one position identifier; and
   controlling the first virtual character to perform automatic pathfinding to a position corresponding to the first target position identifier in the game scene.

* * * * *